(12) United States Patent
Inoue

(10) Patent No.: US 6,371,874 B1
(45) Date of Patent: Apr. 16, 2002

(54) SPROCKET EQUIPPED WITH CUSHION BODY

(75) Inventor: Kozo Inoue, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/579,301

(22) Filed: May 25, 2000

(30) Foreign Application Priority Data

May 27, 1999 (JP) .............................. 11-147749

(51) Int. Cl.[7] .............................. F16H 7/06; F16H 55/06
(52) U.S. Cl. ............................. 474/156; 474/161
(58) Field of Search ............................. 474/156, 161, 474/152, 190–191, 177, 150, 178, 153, 160, 151, 162; 198/843, 834, 781, 787

(56) References Cited

U.S. PATENT DOCUMENTS

| | | | | |
|---|---|---|---|---|
| 2,953,930 A | * | 9/1960 | Meyer | 474/156 |
| 3,057,219 A | * | 10/1962 | Montgomery | 474/156 |
| 4,227,422 A | * | 10/1980 | Kawashima et al. | 474/156 |
| 4,348,199 A | | 9/1982 | Oonuma | |
| 5,107,982 A | * | 4/1992 | Walter | 198/781 |
| 5,224,903 A | * | 7/1993 | Langhof et al. | 474/161 |
| 5,980,408 A | * | 11/1999 | Schulz | 474/161 |

FOREIGN PATENT DOCUMENTS

| | | |
|---|---|---|
| DE | 32 01 210 A1 | 7/1983 |
| GB | 1 600 589 | 10/1981 |
| JP | 69168 * | 4/1982 |
| JP | 173469 * | 10/1982 |

* cited by examiner

*Primary Examiner*—Thomas R. Hannon
*Assistant Examiner*—Marcus Charles
(74) *Attorney, Agent, or Firm*—Dann, Dorfman, Herrell and Skillman, P.C.; Henry H. Skillman

(57) ABSTRACT

A sprocket has a central through-hole for attachment of the sprocket to a rotating shaft, a boss coaxial with the through-hole, and teeth on the periphery of the sprocket. The boss has a cylindrical outer surface coaxial with the through-hole and having stepped small-diameter portions formed at opposite ends of the boas. A cushion body is in the form of a disk having an eccentric through-hole and includes an annular bearing having a cylindrical inner surface defining the through-hole, and a cushion member press-fitted over a cylindrical outer surface of the bearing. The bearing is slidably mounted on the cylindrical outer surface of the boss on each side of the teeth, and a ring-like flange is press-fitted over each stepped portion of the boss so as to prevent the cushion body from moving in the axial direction of the sprocket while allowing sliding movement of the cushion body relative to the boss. With this arrangement, the cushion body is kept in a prescribed position at all times even when the wrapping angle of a chain relative to the sprocket exceeds 180°. Thus, striking noise at engagement points between the chain and the sprocket can surely be reduced by the cushion body.

7 Claims, 2 Drawing Sheets

SPROCKET EQUIPPED WITH CUSHION BODY

BACKGROUND OF THE INVENTION

1. Field of the Invention

The present invention relates generally to a sprocket equipped with cushion body, and more particularly to such a sprocket which is equipped with a cushion body capable of reducing striking noise at the engagement points between a sprocket and a chain when a wrapping angle of the chain relative to the sprocket exceeds 180°.

2. Description of the Related Art

In an automobile engine, for example, in order to drive a camshaft, a chain is trained around a crank sprocket and a cam sprocket. FIG. 4 shows the relationship between such camshaft-driving chain C and the crank sprocket 50. In the sprocket 50 of this type, a cushion body 52 may be sometimes used as a noise suppression measure. The cushion body 52 is mounted on the sprocket 50 in such a manner that it comes in contact with the chain C at both an engagement start point and an engagement finish point of the chain C relative to the sprocket 50.

The chain C, as it is in the position indicated by the solid lines shown in FIG. 4, has a wrapping angle smaller than 180°. In this position, the cushion body 52 comes into contact with the chain C at the two engagement points (i.e., the engagement start point and the engagement finish point) of the chain C relative to the sprocket 50. The cushion body 52 has a ring-like shape with uniform thickness and is floatingly mounted on a boss 54 of the sprocket 50. The cushion body 52 endeavors to reduce striking noise at the engagement points between the chain C and the sprocket 50 while it is constrained in position relative to the sprocket 50 at three points, one being a contact point between the cushion body 52 and the boss 54 and the other two being contact points between the cushion body 52 and the chain C.

However, since the cushion body 52 is not prevented from moving in a direction perpendicular to the axis the sprocket 50, the position of the cushion body 52 relative to the engagement points between the chain C and the sprocket 50 is not always constant. This may lead to an insufficient noise-reducing effect achieved by the cushion body 52.

In the case where a crank sprocket of a smaller diameter is used, a greater chain wrapping angle may become necessary. In addition, when the chain C is arranged to further drive an oil pump, an alternator or the like auxiliary device disposed near the crank sprocket 50, the resulting arrangement may necessary have a greater chain wrapping angle. In these cases, the wrapping angle of the chain C exceeds 180°, as indicated by the phantom lines shown in FIG. 4. While the phantom-lined chain C is running, a downward force is applied from the chain C to the cushion body 52, tending to separate the cushion body 52 from the boss 54. The cushion body 52 thus displaced or offset downward from predetermined position is no longer possible to redice striking noise at the engagement points between the chain C and the sprocket 50. Rather, the downwardly offset cushion member per se forms an additional noise source. This problem becomes critical as the diameter of the sprocket becomes small because a sprocket of a smaller diameter is accompanied by a greater chordal action (also called "chordal effect") of the chain.

In the general engine mounting structure, the crank sprocket 50 is disposed at a lower position in the vertical direction. In this case, the cushion body 52 is mounted such that a space is defined between the cushion body 52 and the chain C at a position below the sprocket 50. Since the cushion body 52 has an own weight which acts in the same direction as the downward force applied from the chain C, the cushion body 52 is likely to move in an offset direction. Especially if the cushion body 52 is displaced or offset from the redetermined position due to its own weight and a downward component force of the chain tension after the engine is stopped, restarting of the engine will immediately produce great striking noise caused due to direct contact between the chain C and the sprocket 50 and floating movement of the cushion body 50.

In addition, since the cushion body 52 is not fixed in position relative to the sprocket 50, the cushion body 52 needs to be displaced in a predetermined position when the chain C is set or trained around the sprocket 50. Thus, the efficiency of a chain-and-sprocket assembling work is low.

SUMMARY OF THE INVENTION

It is accordingly an object of the present invention to provide a sprocket equipped with a cushion body which is set in a predetermined position and, hence, is capable of surely reducing noise at engagement points between a chain and the sprocket when a wrapping angle of the chain relative to the sprocket exceeds 180°.

To achieve the object, there is provided according to the present invention a sprocket equipped with a cushion body mounted on the cylindrical outer surface of a coaxial boss of the sprocket for reducing striking noise at engagement points between the sprocket and a chain wound around the sprocket, wherein the cushion body has a solid structure including a cylindrical inner surface slidable on the cylindrical outer surface of the boss and a cylindrical outer surface eccentric to the cylindrical outer surface of the boss, the cylindrical outer surface of the cushion body being in contact with the chain at the engagement points between the sprocket and the chain.

In the state where the chain is wound around the sprocket equipped with the cushion body, the chain is in contact with the cushion body at the engagement points between the sprocket and the chain. When the wrapping angle of the chain relative to the sprocket exceeds 180°, the cushion body is subjected to a component force of the chain tension acting on each engagement point in a direction toward a top of the sprocket. In this instance, however, since the cushion body has a solid structure, movement of the cushion member is prohibited in all directions except the circumferential direction even if any force is applied to the cushion body. Thus, the cushion body can retain its prescribed posture or position.

When the sprocket starts rotation, the chain comes into meshing engagement with the sprocket at the engagement points. At the same time, the cushion body is in contact with the chain at the engagement points between the chain and the sprocket to thereby reduce striking noise between the chain and the sprocket. The cushion body is in sliding contact with the boss so that it can retain its prescribed position in which the cushion body is always in contact with the chain at the engagement points.

Even if the wrapping angle of the chain relative to the sprocket exceeds 180°, the cushion body, owing to its solid structure as opposed to the hollow structure of the conventional cushion body, can retain its prescribed position against forces (including a component force of the chain tension and the action of the gravity) tending to move the cushion body in a direction perpendicular to the axis of the sprocket. Thus, the cushion body achieves its prescribed function to reduce striking noise at the engagement points between the chain and the sprocket.

The cushion body may be comprised of a single cushion member of a disk-like configuration having an eccentric through-hole defined by the cylindrical inner surface of the cushion body and an outer peripheral surface forming the cylindrical outer surface of the cushion body. The single cushion member is simple in construction and can be produced at a relatively low cost.

As an alternative, the cushion body may be comprised of an annular bearing slidably mounted on the cylindrical outer surface of the boss and having a cylindrical outer surface, and an eccentric cushion member attached to the cylindrical outer surface of the bearing and having a cylindrical outer surface forming the cylindrical outer surface of the cushion body.

The cushion body is slidable relative to the boss and hence is not fully prevented from moving in the circumferential direction of the boss. Thus, due to a frictional force acting between the chain and the cushion body, the cushion body tends to move in the circumferential direction of the aprocket. This may cause slight oscillation or wobbling of the cushion member about the axis of the sprocket which makes it impossible for the cushion body to achieve engagement with the chain at the correct engagement points, resulting in an insufficient noise-reducing performance of the cushion body.

To make sure that the cushion body can engage the chain at the correct engagement points even when subjected to a force tending to rotate the cushion member about the axis of the sprocket, it is preferable that the cushion body further includes an annular second cushion member slidably mounted on the cylindrical outer surface of the cushion member and having an outer peripheral surface forming the cylindrical outer surface of the cushion body. With this arrangement, since the cushion body itself does not oscillate about the axis of the sprocket and the second cushion member rotates on and along the periphery of the cushion body, the second cushion member is always in contact with the chain at the engagement points between the chain and the sprocket. Thus, striking noise at the engagement points between the chain and the sprocket can be reduced sufficiently.

It is also preferable that a ring-like flange is press-fitted on the cylindrical outer surface of the boss so as to prevent the cushion body from moving in the axial direction of the sprocket while allowing sliding movement of the cushion body relative to the boss. The cushion body thus positioned and link plates of the chain are tangent internally at the engagement points between the chain and the sprocket.

The sprocket and the cushion body are preferably connected together in an assembled condition by a connector pin fitted in a pair of aligned holes formed in the sprocket and the cushion body, respectively. This arrangement is particularly advantageous when the chain is to be wound around the sprocket with two such cushion bodies mounted on both sides of teeth on the periphery of the sprocket. The cushion body are rotatable relative to the boss of the sprocket. However, since the two cushion bodies and the sprocket are connected together in an assembled c condition by means of the connector pin, relative rotation between the cushion bodies and the sprocket does not take place. Thus, the chain can readily be wound around the sprocket t while the sprocket and the cushion bodies are kept in the assembled condition.

In the case where the sprocket is used as a crank sprocket in an automobile engine, owing to the eccentricity of the cushion bodies, respective thick portions of the cushion bodies tend to turn downward until they assume their lowermost position. This movement may hinder accurate positioning of the cushion bodies relative to the chain when the chain is set to wrap around the sprocket. In addition, one of the cushion bodies is disposed between the sprocket and an engine block and hence is uneasy to manipulate. However, by connecting together the cushion bodies and the sprocket in an assembled condition by means of the connector pin, the chain can readily be wound around the sprocket while the cushion bodies are kept in a correct position relative to the chain. This may pose a remarkable increase in the assembling efficiency of a sprocket chain drive.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
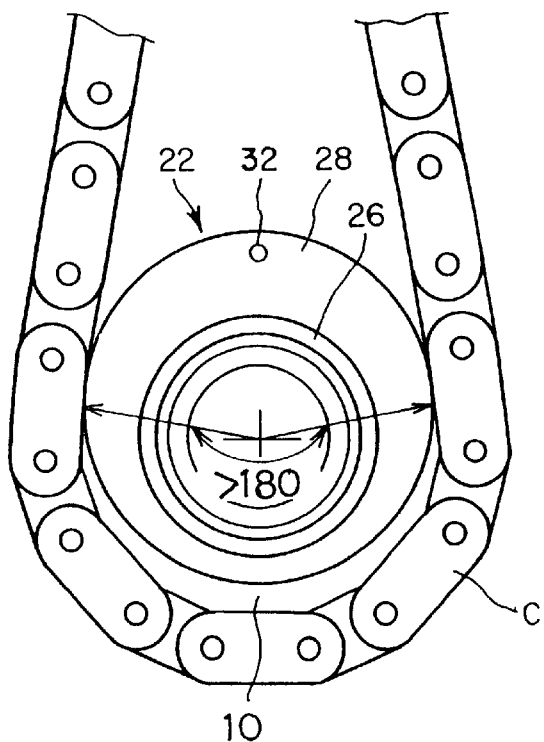
FIG. 1 is a front elevational view of a sprocket equipped with a cushion body according to a first embodiment of the present invention.
Figure 2:
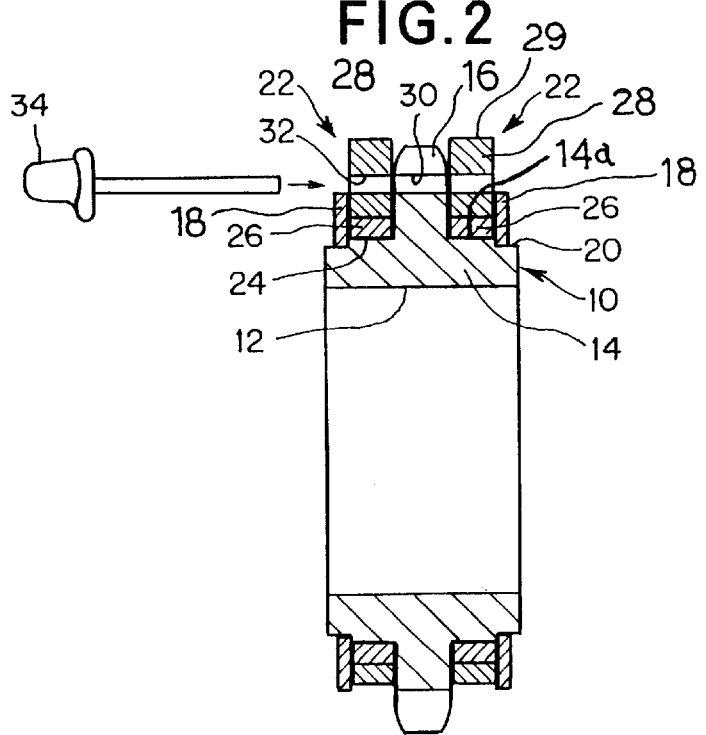
FIG. 2 is an enlarged cross-sectional view of FIG. 1.

Referring to FIGS. 1 and 2, there is shown a sprocket according to a first embodiment of the present invention. The sprocket 10 when used with a chain C (FIG. 1) forms a take-up angle in excess of 180°, as shown in FIG. 1. The take-up angle of the sprocket 10 is equivalent to a wrapping angle of the chain C with respect to the sprocket 10.

As shown in FIG. 2, the sprocket 10 has a central through-hole 12 for receiving therein a shaft on which the sprocket 10 is to be mounted, a boss 14 coaxial with the central through-hole 12, and teeth 16 on the periphery of the sprocket 10. The boss 14 has a cylindrical outer surface 14a coaxial with the central through-hole 12 and projecting in an axial direction of the sprocket 10. The outer surface 14a includes a pair of stepped small-diameter portions 20 formed at opposite ends of the boss 14, and a pair of ring-like flanges 18, 18 mounted to the stepped small-diameter portions 20, 20, respectively. In FIG. 1, the flanges 18 are omitted for the purpose of illustration.

As shown in FIG. 1, a cushion body 22 generally comprises a circular plate or disk having an eccentric through-hole 24 (FIG. 2) and is slidably mounted on the boss 14 on each side of the teeth 14 such that a slight gap or clearance is defined between a cylindrical inner surface defining the through-hole 24 and the cylindrical outer surface 14a of the boss 14. The cushion body 22 is comprised of an annular bearing 26 having a cylindrical inner surface, and an eccentric cushion member 28 made of steel or plastics and press-fitted over a cylindrical outer surface of the bearing 26. The cylindrical inner surface of the bearing 26 forms the cylindrical inside surface of the cushion body 22, The eccentric cushion member 28 is formed of a circular plate or disk having an eccentric through-hole defined by a cylindrical surface which is press-fitted with the cylindrical outer surface of the bearing 26. The eccentricity and outside diameter of the cushion member 28 are determined such that when the chain C is wound around the sprocket 10, an outer periphery of the cushion member 28 comes in contact with the chain C at engagement points between the chain C and the sprocket 10.

The flanges 18 are press-fitted on and then caulked to the stepped small-diameter portions 20 so that cushion bodies 22 are prevented from moving in the axial direction of the sprocket 10 while they are allowed to slide on the cylindrical outer surface 14a of the boss 14. The flanges 18 may be replaced with a sleeve bearing (not shown) having an annular flange at one end thereof. In this instance, the flanged sleeve bearing is press-fitted over the boss 14 and slidably supports thereon a cushion member 28 with the cushion member 20 being held or sandwiched between the annular flange and a body of the sprocket 10.

As shown in FIG. 2, the sprocket 10 and each of the cushion bodies 22 have small-diameter through-holes 30 and 32 formed in alignment with each other for receiving therein a connector pin 34. The connector pin 34 is inserted into the through-holes 30, 32 to interconnect or gather the cushion bodies 22 and the sprocket 10 in an assembled condition against relative rotation when the chain 2 is to be wound around the sprocket 10.

Turning back to FIG. 1, the chain C is wound around the sprocket 10. When the chain C thus wound around the sprocket 10 is stationary, each cushion body 22 engages the chain C at engagement points between the chain C and the sprocket 10. The cushion body 22 has a solid structure and hence can retain its initial posture or position even when it is subjected to a tension in the chain C.

When the sprocket 10 is driven for rotation, bearing 26 of the cushion body 22 is in slide contact with the boss 14 (FIG. 2) of the sprocket 10, and the outer periphery of the cushion member 28 is in contact with the chain C at engagement points between the chain C and the sprocket 10 to thereby reduce striking noise between the chain C and the sprocket 10. The cushion body 22 having a solid structure can also retain its initial posture or position while the sprocket is rotating.

Figure 3:
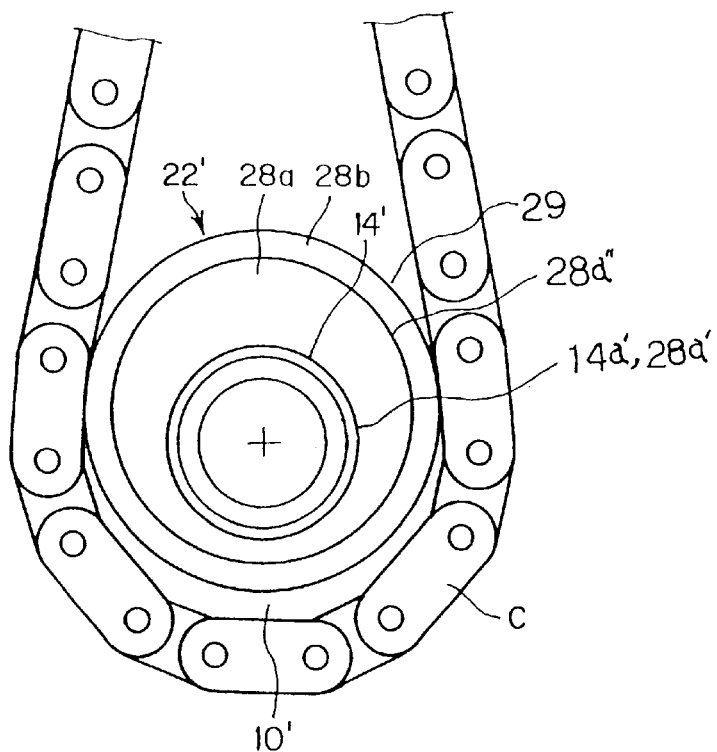
FIG. 3 is a view similar to FIG. 1, but showing a sprocket equipped with a cushion body according to a second embodiment of the present invention.
Figure 4:
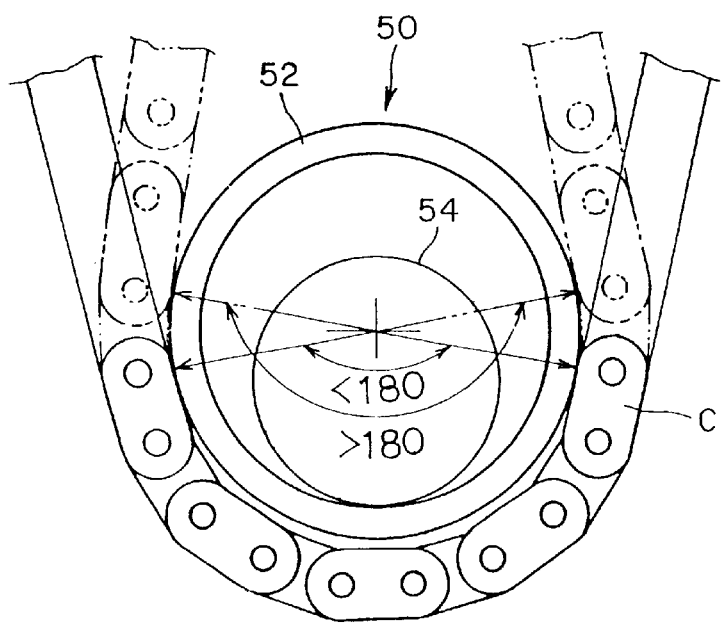
FIG. 4 is a front elevational view of a conventional sprocket equipped with a cushion body.

FIG. 3 shows a sprocket 10' according to a second embodiment of the present invention. The sprocket 10' itself has the same structure as the sprocket 10 of the first embodiment shown in FIGS. 1 and 2. A cushion body 22' is comprised of an inner first cushion member 28a made of steel, and an outer second cushion member 28b made of steel or plastics.

The first cushion member 28a is comprised of a circular plate or disk and has an eccentric through-hole defined by a cylindrical inner surface 28a' and a cylindrical outer surface 28a" eccentric to the cylindrical inner surface 28a'. The cylindrical inner surface 28a' is slidably fitted with a cylindrical outer surface 14a' of the boss 14' of the sprocket 10'.

The second cushion member 28b is in the form of a circular ring having a uniform thickness. The ring-shaped second cushion member 28b is slidably fitted over the cylindrical outer surface 28a" of the first cushion member 28a. The first and second cushion members 28a, 28b are disposed on each side of teeth (not shown but identical to the teeth 16 shown in FIG. 2) of the sprocket 10' and they are prevented from moving in the axial direction of the sprocket 10' by means of a ring-like flange (not shown but identical to the one 18 shown in FIG. 2).

With this arrangement, even when the cushion body 22' is going to turn with frictional force, variations of contact points between the cushion body 22' and the chain C are very small because the second cushion member 28b revolves on the first cushion member 28a about the center which is eccentric to the axis of rotation of the sprocket 10'. Thus, the cushion member 22' can surely reduce striking noise at the engagement points between the chain C and the sprocket 10'.

It can be appreciated that the second cushion member 28b may also be incorporated in the cushion body 22 of the first embodiment shown in FIGS. 1 and 2. In this instance, the second cushion member 28b is mounted on the eccentric cushion member 28 of the cushion body 22 and an outer peripheral surface of the second cushion member 28b forms the cylindrical outer surface of the cushion body 22 which is in slide contact with the chain C. In addition, the sprocket 10' and the cushion body 22' of the second embodiment shown in FIG. 3 may have a pin-and-hole connection which is the same as the one formed jointly by the connector pin 34 and the holes 30 and 32 formed in the sprocket 10 and each cushion member 22, respectively, of the first embodiment shown in FIGS. 1 and 2.

As described above, the sprocket of the present invention is equipped with a cushion body which is capable of maintaining its prescribed position at all times even when the wrapping angle of a chain relative to the sprocket exceeds 180°, the cushion body is subjected to a chain tension, and the weight of the cushion body acts in the same direction as the chain tension. The cushion body is, therefore, always able to reduce striking noise at engagement points between the chain and the sprocket.

Obviously, various minor changes and modifications of the present invention are possible in the light of the above teaching. It is therefore to be understood that within the scope of the appended claims, the present invention may be practiced otherwise than as specifically described.

What is claimed is:

1. A sprocket equipped with a cushion body for reducing striking noise at engagement points between the sprocket and a chain wound around the sprocket, said sprocket including a central boss having a cylindrical outer surface coaxial with the axis of rotation of said sprocket and projecting in an axial direction of said sprocket, and said cushion body being mounted on said cylindrical outer surface of said boss and having a solid structure including a cylindrical inner surface concentric with and rotatable on said cylindrical outer surface of said boss and a cylindrical outer surface eccentric to said cylindrical outer surface of said boss, said cylindrical outer surface of said cushion body being in contact with the chain at the engagement points between the sprocket and the chain.

2. A sprocket equipped with a cushion body according to claim 1, wherein said sprocket is comprised of an annular bearing mounted on said cylindrical outer surface of said boss and having a cylindrical outer surface, and an eccentric cushion member attached to said cylindrical outer surface of said bearing and having a cylindrical outer surface forming said cylindrical outer surface of said cushion body.

3. A sprocket equipped with a cushion body according to claim 1, further including a ring-like flange press-fitted on said cylindrical outer surface of said boss so as to prevent said cushion body from moving in the axial direction of the sprocket while allowing rotary movement of said cushion body relative to said boss.

4. A sprocket equipped with a cushion body according to claim 1, wherein said sprocket and said cushion body are connected together in an assembled condition by a connector pin fitted in a pair of aligned holes formed in said sprocket and said cushion body, respectively.

5. A sprocket equipped with a cushion body according to claim 1, wherein said sprocket has teeth on the periphery thereof, and said cushion body is mounted on said boss on both sides of said teeth.

6. A sprocket equipped with a cushion body according to claim 1, wherein said cushion body is comprised of a single cushion member of a disk-like configuration having an eccentric through-hole defined by said cylindrical inner surface of said cushion body and an outer peripheral surface forming said cylindrical outer surface of said cushion body.

7. A sprocket equipped with a cushion body according to claim 6, said cushion body further includes an annular second cushion member slidably mounted on said cylindrical outer surface of said cushion member, said second cushion member having an outer peripheral surface forming said cylindrical outer surface of said cushion body.

* * * * *